United States Patent
Sato et al.

(10) Patent No.: US 7,949,807 B2
(45) Date of Patent: May 24, 2011

(54) DATA CONVERSION APPARATUS AND DATA CONVERSION METHOD

(75) Inventors: Tsuneo Sato, Tokyo (JP); Keiki Yamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 390 days.

(21) Appl. No.: 11/884,314

(22) PCT Filed: Mar. 16, 2005

(86) PCT No.: PCT/JP2005/004637
§ 371 (c)(1),
(2), (4) Date: Aug. 14, 2007

(87) PCT Pub. No.: WO2006/098015
PCT Pub. Date: Sep. 21, 2006

(65) Prior Publication Data
US 2008/0276106 A1    Nov. 6, 2008

(51) Int. Cl.
    G06F 13/12    (2006.01)
(52) U.S. Cl. .................. 710/67; 710/62; 713/300
(58) Field of Classification Search .................. None
    See application file for complete search history.

(56) References Cited

U.S. PATENT DOCUMENTS

| | | | |
|---|---|---|---|
| 5,694,143 A * | 12/1997 | Fielder et al. | 345/519 |
| 6,466,669 B1 | 10/2002 | Matsui et al. | |
| 6,510,518 B1 | 1/2003 | Jaffe et al. | |
| 7,006,021 B1 * | 2/2006 | Lombaard | 341/100 |
| 2003/0048903 A1 | 3/2003 | Ito et al. | |
| 2005/0055596 A1 | 3/2005 | Abe et al. | |
| 2005/0114697 A1 * | 5/2005 | Cornell et al. | 713/200 |
| 2006/0176241 A1 * | 8/2006 | Sampsell | 345/2.1 |
| 2009/0245508 A1 * | 10/2009 | Umeno | 380/28 |

FOREIGN PATENT DOCUMENTS

| | | |
|---|---|---|
| EP | 0 981 223 A2 | 2/2000 |
| EP | 1 507 247 A1 | 2/2005 |
| JP | 5-265706 A | 10/1993 |
| JP | 2000-66585 A | 3/2000 |
| JP | 2002-366029 A | 12/2002 |
| JP | 2004-318670 A | 11/2004 |

OTHER PUBLICATIONS

Leong, et al. "A Bit-Serial Implementation of the International Data Encryption Algorithm Idea"; IEEE Symposium on Field-Programmable Custom Computing Machines, 2000, pp. 122-131.

* cited by examiner

*Primary Examiner* — Eron J Sorrell
(74) *Attorney, Agent, or Firm* — Birch, Stewart, Kolasch & Birch, LLP.

(57) ABSTRACT

It is aimed, for example, to reduce an amount of power consumption of an operation concerning data encryption or decryption and to make it difficult to perform a power analysis. In the case an exclusive OR operation between 32-bit input data and a 32-bit key is performed to obtain output data of 32 bits, the input data is kept in an input shift register 105 of 32 bits and the key is kept in a key shift register 106 of 32 bits. Then, 1 bit of the input data and 1 bit of the key are input into a serial operator 107, and an exclusive OR of 1 bit is obtained and shifted to the left end of the input shift register 105. The key shift register 106 performs a cyclic right shift. By performing the above thirty-two times, the operation of 32 bits is completed and the last result is kept in the input shift register 105.

17 Claims, 16 Drawing Sheets

Fig. 16

122: m x n LOOK-UP TABLE
(m-BIT INPUT AND n-BIT OUTPUT PARALLEL OPERATOR)

| m-BIT OUTPUT | | n-BIT OUTPUT |
|---|---|---|
| 00 | → | 01 |
| 01 | → | 00 |
| 10 | → | 10 |
| 11 | → | 11 |

Fig. 17

123: m x 1 LOOK-UP TABLE
(m-BIT INPUT AND 1-BIT OUTPUT SERIAL OPERATOR)

| m-BIT OUTPUT | | 1-BIT OUTPUT |
|---|---|---|
| 00 | → | 0 |
| 01 | → | 0 |
| 10 | → | 1 |
| 11 | → | 1 |

····· x n

| m-BIT OUTPUT | | 1-BIT OUTPUT |
|---|---|---|
| 00 | → | 1 |
| 01 | → | 0 |
| 10 | → | 0 |
| 11 | → | 1 |

DATA CONVERSION APPARATUS AND DATA CONVERSION METHOD

TECHNICAL FIELD

The present invention relates to a data conversion apparatus and a data conversion method.

BACKGROUND ART

According to the encryption apparatus and the decryption apparatus disclosed in the Patent Document 1, data is ciphered by a mask "a" and a mask "b", and by removing the influence of the masks after operations of encrypting or decrypting, data without the masks can be obtained. Thus, by using the mask "a" and the mask "b", it is possible to prevent the internal data from being estimated and to deter it from being decrypted based on a power analysis.

Patent Document 1: Japanese Unexamined Patent Publication No. 2000-66585 (pp. 7-13, FIG. 4)

DISCLOSURE OF THE INVENTION

Problems to be Solved by the Invention

In the conventional encryption apparatus and decryption apparatus as stated above, since it is necessary to newly generate a mask, a circuit for generating the mask is required, thereby increasing circuits. Moreover, since the operation is performed per block unit by parallel processing, when a block length is long, the number of operation elements used simultaneously increases, thereby requiring more power. As a result, the problem occurs that a power analysis is easily performed. Furthermore, when the block length is long, since an operation delay is generated in each bit differently in each block, the problem occurs that a power analysis is easily performed because of the delay.

FIG. 21 shows an example of influence on the amount of power consumption, caused by difference with respect to the operation delay per bit. In FIG. 21, the difference with respect to delay between the input bits A and B affects an output bit of an AND gate. As shown in the figure, the larger the difference with respect to delay between the inputs becomes, the more likely the power change occurs. Consequently, the amount of power consumption in a unit time becomes large.

The present invention aims, for example, to reduce the amount of power consumption of operations concerning data encryption or decryption and to make it difficult to perform a power analysis.

Means to Solve the Problems

A data conversion apparatus according to the present invention converts data by using a combination of multi-bit operations. The data conversion apparatus is configured to, while a computation can be processed with a multi-bit parallel operation, process the computation with a serial operation, to reduce an amount of power consumption per unit time compared with that in a case of the multi-bit parallel operation.

The data conversion apparatus includes:

a first storage part to store multiple bits and output each bit of the multiple bits one by one;

a second storage part to store other multiple bits and output each bit of the other multiple bits one by one; and an operation part to perform an operation on the each bit outputted by the first storage part and the each bit outputted by the second storage part, and to make the first storage part store a result of the operation.

The data conversion apparatus further includes a selection part to select a type of the operation performed by the operation part.

The first storage part and the second storage part are shift registers.

The data conversion apparatus is configured to, while a computation can be processed with an m-bit (m>1) input and n-bit (n>1) output parallel operation, process the computation with an m-bit input and 1-bit output serial operation.

A data conversion apparatus according to the present invention converts data by using a combination of multi-bit operations. The data conversion apparatus is configured to, while a computation can be processed with consecutive operations of a preceding operation and a subsequent operation being concatenated, process the computation with separate operations of a preceding operation and a subsequent operation being separated by providing a storage part between the preceding operation and the subsequent operation, to reduce an amount of power consumption per unit time compared with that in a case of the consecutive operations.

After storing all bits included in a result of the preceding operation, the storage part gives all the bits to the subsequent operation.

The data conversion apparatus includes an operation part, including a plurality of input ports for inputting a result of the preceding operation, to perform the subsequent operation based on the inputting of the plurality of input ports.

The storage part is provided before each input port of the operation part.

A data conversion method according to the present invention uses a data conversion apparatus that converts data by using a combination of multi-bit operations. The data conversion method includes processing, while a computation can be processed with a multi-bit parallel operation, the computation with a serial operation, to reduce an amount of power consumption per unit time compared with that in a case of the multi-bit parallel operation.

The data conversion method includes:

storing multiple bits in a first storage part and outputting each bit of the multiple bits one by one;

storing other multiple bits in a second storage part and outputting each bit of the other multiple bits one by one; and performing an operation on the each bit outputted from the first storage part and the each bit outputted from the second storage part, and storing a result of the operation in the first storage part.

The data conversion method further includes selecting a type of the operation on the each bit outputted from the first storage part and the each bit outputted from the second storage part.

The data conversion method includes processing, while a computation can be processed with an m-bit (m>1) input and n-bit (n>1) output parallel operation, the computation with an m-bit input and 1-bit output serial operation.

A data conversion method according to the present invention uses a data conversion apparatus that converts data by using a combination of multi-bit operations. The data conversion method includes processing, while a computation can be processed with consecutive operations of a preceding operation and a subsequent operation being concatenated, the computation with separate operations of a preceding operation and a subsequent operation being separated by providing a storage part between the preceding operation and the subsequent operation, to reduce an amount of power consumption per unit time compared with that in a case of the consecutive operations.

The data conversion method includes giving, after storing all bits included in a result of the preceding operation, in the storage part, all the bits to the subsequent operation.

The data conversion method includes:

performing, by using an operation part that includes a plurality of input ports for inputting a result of the preceding operation, the subsequent operation based on the inputting of the plurality of input ports; and providing the storage part before each input port of the operation part.

EFFECTS OF THE INVENTION

According to the present invention, in the data conversion apparatus, while a computation can be processed with a multi-bit parallel operation, by processing the computation with a serial operation, the amount of power consumption per unit time can be reduced compared with that in the case of the multi-bit parallel operation, which makes it difficult to perform a power analysis.

Moreover, in the data conversion apparatus, a first storage part stores multiple bits and outputs each bit of them one by one, a second storage part stores other multiple bits and outputs each bit of them one by one, and an operation part performs an operation on the bit outputted by the first storage part and the bit outputted by the second storage part, and makes the first storage part store the operation result. Thus, it becomes possible to utilize the first storage part efficiently.

Moreover, in the data conversion apparatus, since a selection part selects the type of the operation performed by the operation part, it becomes possible to utilize the first storage part and the second storage part efficiently.

Furthermore, in the data conversion apparatus, since the first storage part and the second storage part are shift registers, it is possible to make an unusual state of power consumption unlikely.

Moreover, in the data conversion apparatus, while a computation can be processed with an m-bit (m>1) input and n-bit (n>1) output parallel operation, by processing the computation with an m-bit input and 1-bit output serial operation, it becomes possible to adjust the output timing of each bit of n-bit output.

According to the present invention, in the data conversion apparatus, while a computation can be processed with consecutive operations of a preceding operation and a subsequent operation being concatenated, by processing the computation with separate operations of a preceding operation and a subsequent operation being separated by providing a storage part between the preceding operation and the subsequent operation, the amount of power consumption per unit time can be reduced compared with that in the case of the consecutive operations, which makes it difficult to perform a power analysis.

Moreover, in the data conversion apparatus, after having stored all the bits included in a result of the preceding operation, the storage part gives all of them to the subsequent operation. Thus, it becomes possible to adjust the output timing of the storage part.

Furthermore, in the data conversion apparatus, the operation part includes a plurality of input ports for inputting a result of the preceding operation and performs the subsequent operation based on the plurality of input ports, and the storage part is provided before each input port of the operation part. Thus, it is possible to align the timing of the multiple inputs into the subsequent operation.

According to the present invention, in a data conversion method using the data conversion apparatus, while a computation can be processed with a multi-bit parallel operation, by processing the computation with a serial operation, the amount of power consumption per unit time can be reduced compared with that in the case of the multi-bit parallel operation, which makes it difficult to perform a power analysis.

Moreover, in the data conversion method, multiple bits are stored in the first storage part included in the data conversion apparatus and each bit of them is output one by one, other multiple bits are stored in the second storage part included in the data conversion apparatus and each bit of them is output one by one, an operation on the bit outputted from the first storage part and the bit outputted from the second storage part is performed, and the operation result is stored in the first storage part. Thus, it becomes possible to utilize the first storage part efficiently.

Moreover, in the data conversion method, since the type of the operation performed on the bit outputted from the first storage part and the bit outputted from the second storage part is selected, it becomes possible to utilize the first storage part and the second storage part efficiently.

Furthermore, in the data conversion method, while a computation can be processed with an m-bit (m>1) input and n-bit (n>1) output parallel operation, by processing the computation with an m-bit input and 1-bit output serial operation, it becomes possible to adjust the output timing of each bit of n-bit output.

According to the present invention, in the data conversion method using the data conversion apparatus, while a computation can be processed with consecutive operations of a preceding operation and a subsequent operation being concatenated, by processing the computation with separate operations of a preceding operation and a subsequent operation being separated by providing a storage part between the preceding operation and the subsequent operation, the amount of power consumption per unit time can be reduced compared with that in the case of the consecutive operations, which makes it difficult to perform a power analysis.

Moreover, in the data conversion method, after all the bits included in a result of the preceding operation have been stored in the storage part, all of them are given to the subsequent operation. Thus, it becomes possible to adjust the output timing of the storage part.

Moreover, in the data conversion method, by using the operation part that includes a plurality of input ports for inputting a result of the preceding operation, performing the subsequent operation based on inputs of the plurality of input ports, and providing the storage part before each input port of the operation part, it becomes possible to align the timing of the multiple inputs into the subsequent operation.

PREFERRED EMBODIMENTS FOR CARRYING OUT THE INVENTION

Embodiments of the present invention will be hereafter described with reference to the drawings.

FIG. 1 shows an example of the appearance of a data conversion apparatus of Embodiments stated below.

In FIG. 1, a data conversion apparatus 100 includes a system unit 910, a CRT (Cathode Ray Tube) display device 901, a keyboard (K/B) 902, a mouse 903, a compact disc drive (CDD) 905, a printer device 906, and a scanner device 907, and these are connected by cables. Furthermore, the data conversion apparatus 100 is connected to a facsimile 932 and a telephone 931 by cables, and to the Internet 940 through a local area network (LAN) 942 and a gateway 941.

FIG. 2 shows an example of the hardware structure of the data conversion apparatus in the Embodiments stated below.

In FIG. 2, the data conversion apparatus 100 includes a CPU (Central Processing Unit) 911 which executes a program. The CPU 911 is connected, through a bus 912, to a ROM 913, a RAM 914, a communication board 915, the CRT display device 901, the K/B 902, the mouse 903, an FDD (Flexible Disk Drive) 904, a magnetic disk drive 920, the CDD 905, the printer device 906, and the scanner device 907.

The RAM 914 is an example of a volatile memory. The ROM 913, FDD 904, CDD 905, and magnetic disk drive 920 are examples of a nonvolatile memory. These are examples of a storage device or a storage part.

The communication board 915 is connected to the facsimile 932, the telephone 931, the LAN 942, etc.

The communication board 915, the K/B 902, the scanner device 907, the FDD 904, etc. are examples of an input part. Moreover, the communication board 915, the CRT display device 901, etc. are examples of an output part.

The communication board 915 may be connected not only to the LAN 942, but also directly to the Internet 940 or a WAN (Wide Area Network) such as an ISDN (Integrated Services Digital Network). When directly connected to the Internet 940 or a WAN such as an ISDN, the data conversion apparatus 100 is connected to the Internet 940 or the WAN such as the ISDN, rendering the gateway 941 unnecessary.

An operating system (OS) 921, a window system 922, a program group 923, and a file group 924 are stored in the magnetic disk drive 920. The program group 923 is executed by the CPU 911, the OS 921, and the window system 922.

In the program group 923, programs which execute functions explained as "part"s in the Embodiments stated below are stored. Such programs are read and executed by the CPU 911.

In the file group 924, what are explained as "a result of judging", "a result of computation", and "a result of processing" in the Embodiments stated below are stored as "file"s.

Moreover, arrows in the flowcharts explained in Embodiments stated below mainly indicate input/output of data. Then, for inputting/outputting of data, the data is recorded on other recording medium, such as the magnetic disk drive 920, an FD (Flexible Disk), an optical disk, a CD (Compact Disc), an MD (Mini Disc), and a DVD (Digital Versatile Disc), or alternatively it is transmitted through a signal line or other transmission medium.

Moreover, what is explained as a "part" in Embodiments stated below may be implemented by firmware stored in the ROM 913, or only by software or hardware. Alternatively, it may be implemented by a combination of software and hardware, or in combination with firmware.

Moreover, the program which executes the Embodiments described below may be stored in a recording device using other recording medium, such as the magnetic disk drive 920, FD (Flexible Disk), optical disk, CD (Compact Disc), MD (Mini Disc), and DVD (Digital Versatile Disc).

The Embodiments described below can be applied to, for example, an apparatus, a method, and a program where a block encryption algorithm is implemented.

DES (Data Encryption Standard) being an example of a block encryption algorithm is briefly explained herein.

FIG. 3 shows a round structure being a basis of an operation of the DES.

The DES encrypts or decrypts 64-bit data by repeating this round sixteen times. 64-bit data is input into the round. This input data is divided into higher 32 bits and lower 32 bits, and called a block of L and R respectively. n in the figure is a round number.

Rn−1 is input into a function called a mixing function (MF) 201. A key of round n (Kn) is also input into the mixing function 201. When the operation processing of the mixing function 201 is performed, 32-bit data is output.

Next, an exclusive OR operation 202 is performed between the 32-bit output of the mixing function 201 and Ln−1. The result of this becomes Rn of 32 bits. 32-bit Ln is the same as 32-bit Rn−1. 64-bit data made by combining the Ln and the Rn is output as an output of the round n.

The output of a round turns into input of the next round, and the operation of the round is performed again. By repeating this operation sixteen times, the operation of the DES is completed. (To be exact, although the operation processing called permutation is included, explanation for it is omitted.)

FIG. 4 shows details of the operation processing of a mixing function (MF).

32-bit R is input into the mixing function. The bits in this block is divided into eight blocks of six bits each, with having overlapping. An exclusive OR operation 203 is performed between this and a round key of 48 bits, and then eight 6-bit blocks are obtained. By performing substitution processing to each block with a 6-bit input and 4-bit output table called the S-Box 204, which is prescribed, eight 4-bit blocks are obtained. This 32-bit data is permuted (explanation for details of permutation processing is omitted), and then becomes the output of the mixing function.

The round key (Kn) is generated as shown in FIG. 5.

The prescribed permutation is performed to 56 bits excluding 8 bits of parity in 64 bits of the key of the DES, and then they are divided into two blocks of R and L of 28 bits each. One of the two blocks is shown as a "28-bit Key" in FIG. 5. The register of this "28-bit Key" is rotated left by 1 or 2 bits by the round. 24 bits in the rotated "28-bit Key" are permuted (P) in accordance with a rule, and then the 24 bits of one piece of Kn is obtained. The 24 bits of the other piece of Kn is also obtained by the same processing. In the next round, Kn+1 can be obtained by rotating the "28-bit Key" left again and permuting it.

Thus, the block encryption algorithm is configured by combining simple operation elements, such as an exclusive OR, table processing, and permutation.

Next, a power analysis will be explained briefly.

A block cipher is implemented in the form of HW (hardware) or SW (software) to be used. Data can be ciphered by using an apparatus, a method, and a program in which a block cipher is implemented. With respect to the encryption algorithm implemented as HW or SW, it is comparatively easy to measure the power at the moment of HW or SW operates. For example, it can be measured by cutting a pattern which supplies power to a semiconductor chip, inserting a suitable resistance thereto, and measuring a potential difference of both the ends of the resistance with an oscilloscope etc. It is known various information can be extracted from this measured power. (For details, refer to the Internet <http://www.cryptography.com/resources/whitepapers/DPA-technical.html>). In HW and SW where the DES described above is just implemented, it is possible to calculate Kn by the method mentioned in the above reference by estimating an output value of the S-Box in the MF.

Embodiment 1

As mentioned above, a block encryption algorithm is configured by combining simple operation elements, such as an exclusive OR, table processing, and permutation. In the present Embodiment, such operations are configured by elements of 1-bit output, to be implemented. The present Embodiment can be applied not only to the block encryption algorithm but also to other encryption algorithms.

FIG. 6 shows a basic form of a data conversion algorithm according to the present Embodiment, and FIG. 7 shows an example of the configuration of a data conversion apparatus according to the present Embodiment.

FIGS. 6 and 7 show a part of an encryption algorithm, and the algorithm of FIG. 6 is a basic form. That is, a parallel operation is performed for an exclusive OR between a 32-bit key and 32-bit input data to obtain 32-bit output data. In the figure, the 32-bit key is stored in a key register 102, and the 32-bit input data is stored in an input register 101. The operation of the exclusive OR between the 32-bit key and the 32-bit input data is performed by a parallel operator 103, and the operation result is stored in an output register 104. In the present Embodiment, the algorithm of the basic form is implemented as the one shown in FIG. 7 and computation is done. It is supposed that the key is kept in a key shift register (second storage part) 106 of 32 bits, and the input data is kept in an input shift register (first storage part) 105 of 32 bits. 1 bit of the key and 1 bit of the input data are input into a serial operator (operation part) 107, and an exclusive OR of 1 bit is obtained and shifted to the left end of the input shift register 105. The key shift register 106 performs a cyclic right shift. By performing the above thirty-two times, the operation of 32 bits is completed and the last result is kept in the input shift register 105.

FIG. 8 is a flowchart showing an example of operations of the data conversion apparatus of the present Embodiment. "+" in the figure indicates an exclusive OR operation.

First, the data conversion apparatus of the present Embodiment inputs 32-bit data into the input shift register 105 (Step S101) and inputs a 32-bit key into the key shift register 106 (Step S102). Next, the data conversion apparatus shifts the input shift register 105 to the right by 1 bit (Step S103), and outputs 1 bit from the input shift register 105 (Step S104). The bit outputted from the input shift register 105 is defined to be i. Then, the data conversion apparatus shifts the key shift register 106 to the right by 1 bit (Step S105), and outputs 1 bit from the key shift register 106 (Step S106). The bit outputted from the key shift register 106 is defined to be k. The data conversion apparatus performs an operation of an exclusive OR between i and k by the serial operator 107 (Step S107), and inputs the operation result into the input shift register 105 (Step S108). The data conversion apparatus inputs k into the key shift register 106 (Step S109). The data conversion apparatus repeats Steps from S103 to S109 the number of times corresponding to 32 bits.

With respect to the operations of the data conversion apparatus shown in FIG. 8, the order of the processing may be partly interchanged and a part of the processing may be executed in parallel to other processing.

As stated above, in the present Embodiment, the operation of the exclusive OR between the 32-bit key and the 32-bit input data is completed by executing a 2-bit input and 1-bit output exclusive OR sequentially (one by one or serially).

Although an example of the exclusive OR (XOR) is described in the present Embodiment, it can be similarly configured by using a logical addition (OR) or a logical multiplication (AND). Moreover, in the case of an arithmetic addition, an arithmetic subtraction, or an arithmetic multiplication, the operation should be performed by the smallest unit of the operation. Concretely, in the arithmetic addition, 1 bit+1 bit should be processed by 2-bit output, in the arithmetic subtraction, 2 bits−1 bit should be processed by 1-bit output, and, in the arithmetic multiplication, 1 bit×1 bit should be processed by 1-bit output.

When an algorithm is implemented so that the configuration stated above can be achieved, an operation of the minimum unit is repeatedly performed, which allows for instant power to be reduced. Moreover, since an operation result becomes definite one by one as they shift, there occurs no state change of a number of bits at a time. Thus, the possibility of making a characteristic power consumption state becomes low. Such an effect makes it difficult to perform a power analysis.

Although the serial operator 107 performs a serial operation per bit in the present Embodiment, an operation per 2 bits or 3 bits can also bring the effect as stated above.

Moreover, although the serial operation is achieved on the basis of the structure of HW in the present Embodiment, it is also acceptable to achieve the serial operation on the basis of the structure of SW by creating a function which performs a serial operation per bit and repeatedly executing the function, for example.

Moreover, although shift registers are used in the present Embodiment and the input shift register 105 is used to store the operation result of the serial operator 107, it is also acceptable that another register is used to store the operation result. In this case, the input shift register 105 and the key shift register 106 can be registers of types other than the shift registers.

Furthermore, although 32-bit data is used in the present Embodiment, data of other number of bits, such as 64-bit data, may also be used.

As mentioned above, according to the present Embodiment, in the data conversion apparatus, while a computation can be processed with a multi-bit parallel operation, by processing the computation with a serial operation, the amount of power consumption per unit time can be reduced compared with that in the case of the multi-bit parallel operation, which makes it difficult to perform a power analysis.

Moreover, in the data conversion apparatus, the first storage part stores multiple bits and outputs each bit of them one by one, the second storage part stores other multiple bits and outputs each bit of them one by one, and the operation part performs an operation on the bit outputted from the first storage part and the bit outputted from the second storage part, and makes the first storage part store the operation result. Thus, it becomes possible to utilize the first storage part efficiently.

Furthermore, in the data conversion apparatus, since the first storage part and the second storage part are shift registers, it is possible to make an unusual state of power consumption unlikely.

According to the present Embodiment, in a data conversion method using the data conversion apparatus, while a computation can be processed with a multi-bit parallel operation, by processing the computation with a serial operation, the amount of power consumption per unit time can be reduced compared with that in the case of the multi-bit parallel operation, which makes it difficult to perform a power analysis.

Moreover, in the data conversion method, multiple bits are stored in the first storage part included in the data conversion apparatus and each bit of them is output one by one, other multiple bits are stored in the second storage part included in the data conversion apparatus and each bit of them is output one by one, an operation on the bit outputted from the first storage part and the bit outputted from the second storage part is performed, and the operation result is stored in the first storage part. Thus, it becomes possible to utilize the first storage part efficiently.

As mentioned above, the apparatus according to the present Embodiment is an apparatus in which an encryption algorithm is implemented. In the apparatus, which implements the encryption algorithm, and encrypts and decrypts input data, the encryption algorithm is, when implemented, subdivided and decomposed to unit operation elements each of which outputs 1 bit. In the apparatus, a mechanism for holding results of the elements is provided. The encryption algorithm is implemented so that the elements are made to operate sequentially to complete the operation.

Embodiment 2

FIG. 9 shows a basic form of a data conversion algorithm according to the present Embodiment, and FIG. 10 shows an example of the configuration of the data conversion apparatus according to the present Embodiment.

FIGS. 9 and 10 show a part of an encryption algorithm, and the algorithm of FIG. 9 is a basic form. That is, a parallel operation is performed for an exclusive OR between 32-bit input data and a 32-bit key to obtain data. Then, another parallel operation is performed for a logical addition between the obtained data and a different 32-bit key to output 32-bit data. In the figure, the 32-bit input data is stored in an input register 108, the 32-bit key is stored in a first key register 109, and the different 32-bit key is stored in a second key register 111. The operation of the exclusive OR between the 32-bit input data and the 32-bit key is performed by a first parallel operator 110, and the operation of the logical addition between the operation result of the exclusive OR and the different 32-bit key is performed by a second parallel operator 112. The operation result of this logical addition is stored in an output register 113. In the case of the algorithm above stated, since the operation load of the exclusive OR and the logical addition is low, the operations (consecutive operations of a preceding operation and a subsequent operation being concatenated) are usually performed consecutively. However, in the present Embodiment as shown in FIG. 10, a temporary register 114 is provided between the exclusive OR and the logical addition to keep data once before going to the subsequent operation from the preceding operation.

FIG. 11 is a flowchart showing an example of operations of the data conversion apparatus of the present Embodiment. In the figure, "+" indicates an exclusive OR operation and "|" indicates a logical addition operation.

First, the data conversion apparatus of the present Embodiment inputs 32-bit data into the input register 108 (Step S201). The data inputted into the input register 108 is defined to be I. Then, the data conversion apparatus inputs a 32-bit key into the first key register 109 (Step S202). The key inputted into the first key register 109 is defined to be K. Next, the data conversion apparatus outputs I from the input register 108 (Step S203). Then, the data conversion apparatus outputs K from the first key register 109 (Step S204). The data conversion apparatus performs an operation of an exclusive OR between I and K by the first parallel operator 110 (Step S205), and inputs the operation result into the temporary register 114 (Step S206). The data inputted into the temporary register 114 is defined to be I'.

The data conversion apparatus inputs another 32-bit key into the second key register 111 (Step S207). The key inputted into the second key register 111 is defined to be K'. After the temporary register 114 stores all the bits of the operation result I' of 32 bits, the data conversion apparatus outputs I' from the temporary register 114 (Step S208). Next, the data conversion apparatus outputs K' from the second key register 111 (Step S209). Then, the data conversion apparatus performs an operation of a logical addition between I' and K' by the second parallel operator 112 (Step S210), and inputs the operation result into the output register 113 (Step S211).

With respect to the operations of the data conversion apparatus shown in FIG. 11, the order of the processing may be partly interchanged and a part of the processing may be executed in parallel to other processing. The keys inputted into the first key register and the second key register may be the same key.

Although an example of a combination of the exclusive OR (XOR) and the logical addition (OR) is described in the present Embodiment, it can be similarly configured by a combination including other operations, such as a logical multiplication (AND).

By such implementation as stated above, difference of processing time, being different in each operation, is once taken by a register, so that the timing is stabilized. This has an effect of preventing delay of the timing from propagating in the subsequent stages. When the timing is stabilized, the transient state (the state of an unstable operation result generated before the last result becomes definite) of the operation can be reduced, which allows for smaller power. Such an effect makes it difficult to perform a power analysis.

Although 32-bit data is used in the present Embodiment, data of other number of bits, such as 64-bit data, may also be used.

As mentioned above, according to the present Embodiment, in the data conversion apparatus, while a computation can be processed with consecutive operations of a preceding operation and a subsequent operation being concatenated, by processing the computation with separate operations of a preceding operation and a subsequent operation being separated by providing a storage part between the preceding operation and the subsequent operation, the amount of power consumption per unit time can be reduced compared with that in the case of the consecutive operations, which makes it difficult to perform a power analysis.

Moreover, in the data conversion apparatus, after having stored all the bits included in a result of the preceding operation, the storage part gives all of them to the subsequent operation. Thus, it becomes possible to adjust the output timing of the storage part.

According to the present Embodiment, in the data conversion method using the data conversion apparatus, while a computation can be processed with consecutive operations of a preceding operation and a subsequent operation being concatenated, by processing the computation with separate operations of a preceding operation and a subsequent operation being separated by providing a storage part between the preceding operation and the subsequent operation, the amount of power consumption per unit time can be reduced compared with that in the case of the consecutive operations, which makes it difficult to perform a power analysis.

Moreover, in the data conversion method, after all the bits included in a result of the preceding operation have been stored in the storage part, all of them are given to the subsequent operation. Thus, it becomes possible to adjust the output timing of the storage part.

As mentioned above, the apparatus according to the present Embodiment is an apparatus in which an encryption algorithm is implemented. In the apparatus, which implements the encryption algorithm, and encrypts and decrypts input data, a mechanism for holding an operation result is provided when basic operations are performed consecutively in a part of the encryption algorithm. The encryption algorithm is implemented in a way that the mechanism is provided between the basic operations performed consecutively.

Embodiment 3

In the implementation system of Embodiment 1, it is possible to provide a temporary register like the temporary register 114 of FIG. 10 explained in Embodiment 2.

FIG. 12 shows an example of the configuration of a data conversion apparatus according to the present Embodiment.

In FIG. 12, input data is stored in an input shift register (first storage part) 115 of 32 bits, and keys are stored in a first key shift register (second storage part) 116 of 32 bits and a second key shift register (second storage part) 118 of 32 bits. A first serial operator (operation part) 117 performs an operation of an exclusive OR between 1 bit of a key and 1 bit of input data. A second serial operator (operation part) 119 performs an operation of a logical addition between 1 bit of a key and 1 bit of input data. A first selector (selection part) 120 selects either the first serial operator 117 or the second serial operator 119, and a second selector (selection part) 121 selects either the first key shift register 116 or the second key shift register 118. Thus, in the present Embodiment, the output is switched between the exclusive OR and the logical addition at timing, and input into the 32-bit shift register for the input data. A primary shift register and a secondary shift register are prepared so that keys are switched at timing and input into the primary shift register for the keys.

FIG. 13 is a flowchart showing an example of operations of the data conversion apparatus of the present Embodiment. In the figure, "+" indicates an exclusive OR operation and "|" indicates a logical addition operation.

First, the data conversion apparatus of the present Embodiment inputs 32-bit data into the input shift register 115 (Step S301) and inputs a 32-bit key into the first key shift register 116 (Step S302). Next, the data conversion apparatus selects a serial operator by the first selector 120 (Step S303). It is supposed that the first serial operator 117 is herein selected. Then, the data conversion apparatus selects a key shift register by the second selector 121 (Step S304). It is supposed that the first key shift register 116 is herein selected.

Next, the data conversion apparatus shifts the input shift register 115 to the right by 1 bit (Step S305), and outputs 1 bit from the input shift register 115 (Step S306). The bit outputted from the input shift register 115 is defined to be i. Then, the data conversion apparatus shifts the first key shift register 116 to the right by 1 bit (Step S307), and outputs 1 bit from the first key shift register 116 (Step S309). The bit outputted from the key shift register 116 is defined to be k. The data conversion apparatus performs an operation of an exclusive OR between i and k by the first serial operator 117 selected at Step S303 (Step S309), and inputs the operation result into the input shift register 115 (Step S310). As the first key shift register 116 is selected at Step S304, the data conversion apparatus inputs k into the first key shift register 116 (Step S313). The data conversion apparatus repeats Steps from S305 to S313 the number of times corresponding to 32 bits. After the serial operation of the exclusive OR for 32 bits is completed, it returns to Step S303.

Next, the data conversion apparatus selects a serial operator again by the first selector 120 (Step S303). It is supposed that the second serial operator 119 is herein selected. Then, the data conversion apparatus selects a key shift register by the second selector 121 (Step S304). It is supposed that the second key shift register 118 is herein selected.

Next, the data conversion apparatus shifts the input shift register 115 to the right by 1 bit (Step S305), and outputs 1 bit from the input shift register 115 (Step S306). The bit outputted from the input shift register 115 is defined to be i. Then, the data conversion apparatus shifts the first key shift register 116 to the right by 1 bit (Step S307), and outputs 1 bit from the first key shift register 116 (Step S308). The bit outputted from the first key shift register 116 is defined to be k. The data conversion apparatus performs an operation of a logical addition between i and k by the second serial operator 119 selected at Step S303 (Step S311), and inputs the operation result into the input shift register 115 (Step S312). As the second key shift register 118 is selected at Step S304, the data conversion apparatus outputs 1 bit from the second key shift register 118 (Step S314). The bit outputted from the second key shift register 118 is defined to be k'. The data conversion apparatus inputs k' into the first key shift register 116 (Step S315). The data conversion apparatus repeats Steps from S305 to S315 the number of times corresponding to 32 bits.

With respect to the operations of the data conversion apparatus shown in FIG. 13, the order of the processing may be partly interchanged and a part of the processing may be executed in parallel to other processing. In the case of the configuration shown in FIG. 12 being used, since the first selector 120 selects the "output" from the serial operators, both of Step S309 and Step S311 are actually performed. Moreover, when the configuration shown in FIG. 12 is used, the key kept in the key shift register selected by the second selector 121 at Step S304 is not used in the next operation, but firstly input into the first key shift register 116 and then used at the next 32-bit operation. In order to acquire the same effect as the present Embodiment, the data conversion apparatus can be configured so that the second selector 121 may select the output from the key shift registers to the serial operators.

Although 32-bit data is used in the present Embodiment, data of other number of bits, such as 64-bit data, may also be used.

According to the present Embodiment as mentioned above, in the data conversion apparatus, since the selection part selects the type of the operation performed by the operation part, it becomes possible to utilize the first storage part and the second storage part efficiently.

In the present Embodiment, in the data conversion method using the data conversion apparatus, since the type of the operation performed on the bit outputted from the first storage part and the bit outputted from the second storage part is selected, it becomes possible to utilize the first storage part and the second storage part efficiently.

Embodiment 4

FIG. 14 shows a basic form of a data conversion algorithm according to the present Embodiment, and FIG. 15 shows an example of the configuration of a data conversion apparatus of the present Embodiment.

FIGS. 14 and 15 show a part of an encryption algorithm, and the algorithm of FIG. 14 is a basic form. The algorithm of FIG. 14 shows table processing of m-bit input and n-bit output. In the figure, input data of m bits is input into an m×n look-up table (m-bit input and n-bit output parallel operator) 122, and converted into output data of n bits to be output at a time. LUT in the figure denotes a look-up table. In the present Embodiment, this algorithm of a basic form is implemented as the one shown in FIG. 15. That is, n number of m×1 look-up tables 123 of m-bit input and 1-bit output (m-bit input and 1-bit output serial operators) are prepared, n times of table processing are performed by alternately changing the timing, and the output is kept in the register not illustrated.

An example in the case of m=2 and n=2 is shown in the schematic diagrams of FIGS. 16 and 17. FIG. 16 corresponds to FIG. 14 described above, and FIG. 17 corresponds to FIG. 15 described above.

In FIG. 16, when the input into the m×n look-up table 122 is "00," the output becomes "01". Similarly, when the input is "01," "10," and "11," the output corresponding to the input becomes "00," "10," and "11," respectively. On the other hand in FIG. 17, in one m×1 look-up table 123, when the input is "00," "01," "10," and "11," the output corresponding to the input becomes "0," "0," "1," and "1," respectively. In the other m×1 look-up table 123, when the input is "00," "01," "10," and "11," the output corresponding to the input becomes "1," "0," "0," and "1," respectively. In this way, each m×1 look-up table 123 outputs one bit of n bits which the m×n look-up table 122 outputs.

FIG. 18 is a flowchart showing an example of operations of the data conversion apparatus of the present Embodiment.

The data conversion apparatus of the present Embodiment inputs m-bit data into an m×1 look-up table 123 (Step S401), and outputs 1 bit (Step S402). The data conversion apparatus repeats this n times, and finally stores all the output in an n-bit register, etc.

By such implementation as stated above, table processing of m-bit input and 1-bit output is performed only once at a unit timing. Therefore, a timing lag of each bit in the case of n-bit output can be prevented, and there is an effect of stabilizing the timing. Moreover, since the output is 1 bit, power consumption per unit time can be suppressed, which allows for lower possibility of making a characteristic power consumption state. Such an effect makes it difficult to perform a power analysis.

In the present Embodiment, the table processing may be performed by a memory or by a logic element configured to output 1 bit instead of using a memory.

As mentioned above, according to the present Embodiment, in the data conversion apparatus, while a computation can be processed with a multi-bit parallel operation, by processing the computation with a serial operation, the amount of power consumption per unit time can be reduced compared with that in the case of the multi-bit parallel operation, which makes it difficult to perform a power analysis.

Moreover, in the data conversion apparatus, while a computation can be processed with an m-bit (m>1) input and n-bit (n>1) output parallel operation, by processing the computation with an m-bit input and 1-bit output serial operation, it becomes possible to adjust the output timing of each bit of the n-bit output.

According to the present Embodiment, in a data conversion method using the data conversion apparatus, while a computation can be processed with a multi-bit parallel operation, by processing the computation with a serial operation, the amount of power consumption per unit time can be reduced compared with that in the case of the multi-bit parallel operation, which makes it difficult to perform a power analysis.

Furthermore, in the data conversion method, while a computation can be processed with an m-bit (m>1) input and n-bit (n>1) output parallel operation, by processing the computation with an m-bit input and 1-bit output serial operation, it becomes possible to adjust the output timing of each bit of the n-bit output.

As mentioned above, the apparatus according to the present Embodiment is an apparatus in which an encryption algorithm is implemented. In the apparatus, which implements the encryption algorithm, and encrypts and decrypts input data, a table is divided into a plurality of small tables of 1-bit output when a part of the encryption algorithm is performed by table processing. The encryption algorithm is implemented so that the table processing is completed by an implementation system of performing small table processing according to the small tables multiple times by alternately changing the timing.

Embodiment 5

FIG. 19 shows a basic form of a data conversion algorithm according to the present Embodiment, and FIG. 20 shows an example of the configuration of a data conversion apparatus of the present Embodiment.

FIGS. 19 and 20 show circuits in which a part of the encryption algorithm is implemented, and the algorithm of FIG. 19 is a basic form. The circuits as shown in FIGS. 19 and 20 are circuits in the case of logic becoming complicated, such as table processing. In FIG. 19, when 6 bits are input simultaneously, there is a timing lag between the bits input into the two input ports at the input of an AND gate (operation part) 125*a*. Moreover, there is a timing lag between the output of the AND gate (operation part) 125*a* and the output of an OR gate (operation part) 124*b*. Thus, in FIG. 20, a flip-flop (storage part) 127 is provided before each input port of an XOR gate (operation part) 126*a* in order to adjust the timing of the input into each input port of the XOR gate (operation part) 126*a*.

The circuit shown in FIG. 20 can be used, for example, as the m×1 look-up table of FIG. 15 explained in Embodiment 4. In that case, as shown in FIG. 20, it is also acceptable to provide a flip-flop 127*c* for receiving 1-bit output of the XOR gate (operation part) 126*a*.

Moreover, in order to adjust the timing of the input into the two input ports of the AND gate 125*a*, it is acceptable to provide a flip-flop (not illustrated) before each input port of the AND gate 125*a*. Furthermore, it is also acceptable to provide a flip-flop before each input port of all the logic elements.

By such implementation as stated above, the timing lag at the circuit elements can be prevented, and there is an effect of stabilizing the timing. Moreover, since the timing is stabilized, the transient state (the state of an unstable operation result generated before the last result becomes definite) of the operation can be reduced, and there is an effect of making the power small. Such an effect makes it difficult to perform a power analysis.

As mentioned above, according to the present Embodiment, in the data conversion apparatus, while a computation can be processed with consecutive operations of a preceding operation and a subsequent operation being concatenated, by processing the computation with separate operations of a preceding operation and a subsequent operation being separated by providing a storage part between the preceding operation and the subsequent operation, the amount of power consumption per unit time can be reduced compared with that in the case of the consecutive operations, which makes it difficult to perform a power analysis.

Furthermore, in the data conversion apparatus, the operation part includes a plurality of input ports for inputting a result of the preceding operation and performs the subsequent operation based on the input of the plurality of input ports, and the storage part is provided before each input port of the operation part. Thus, it is possible to align the timing of the multiple inputs into the subsequent operation.

According to the present Embodiment, in the data conversion method using the data conversion apparatus, while a computation can be processed with consecutive operations of a preceding operation and a subsequent operation being concatenated, by processing the computation with separate operations of a preceding operation and a subsequent operation being separated by providing a storage part between the preceding operation and the subsequent operation, the amount of power consumption per unit time can be reduced compared with that in the case of the consecutive operations, which makes it difficult to perform a power analysis.

Moreover, in the data conversion method, by using the operation part that includes a plurality of input ports for inputting a result of the preceding operation, performing the subsequent operation based on inputs of the plurality of input ports, and providing the storage part before each input port of the operation part, it becomes possible to align the timing of the multiple inputs into the subsequent operation.

As mentioned above, the apparatus according to the present Embodiment is an apparatus in which an encryption algorithm is implemented. In the apparatus, which implements the encryption algorithm, and encrypts and decrypts input data, mechanisms for holding output are provided when the encryption algorithm is configured by a series of logic elements. The encryption algorithm is implemented in a way that a mechanism for holding outputs is provided at the output stages of logic elements the timings of the signals input into which are different, another mechanism for holding output is provided at the output stages of logic elements the timings of which are the same as those of the above logic elements, and a holding mechanism for receiving 1-bit output of the last output is provided.

BRIEF DESCRIPTION OF THE DRAWINGS

FIG. 16 shows a concrete example of a basic form of a data conversion algorithm according to Embodiment 4;

FIG. 17 shows a concrete example of a data conversion algorithm according to Embodiment 4;

Figure 1:
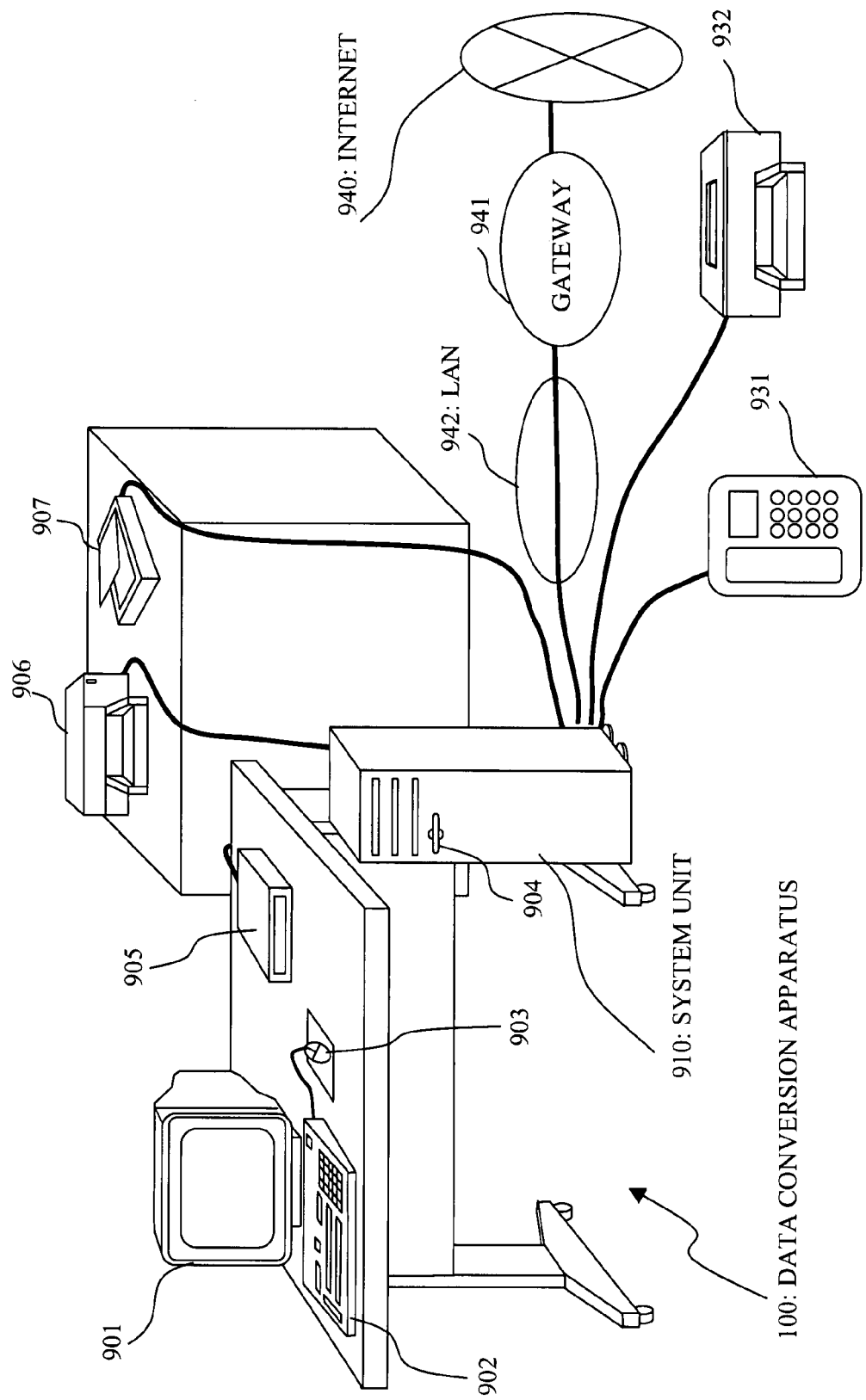
FIG. 1 shows an example of the appearance of a data conversion apparatus according to Embodiments 1 to 5.
Figure 2:
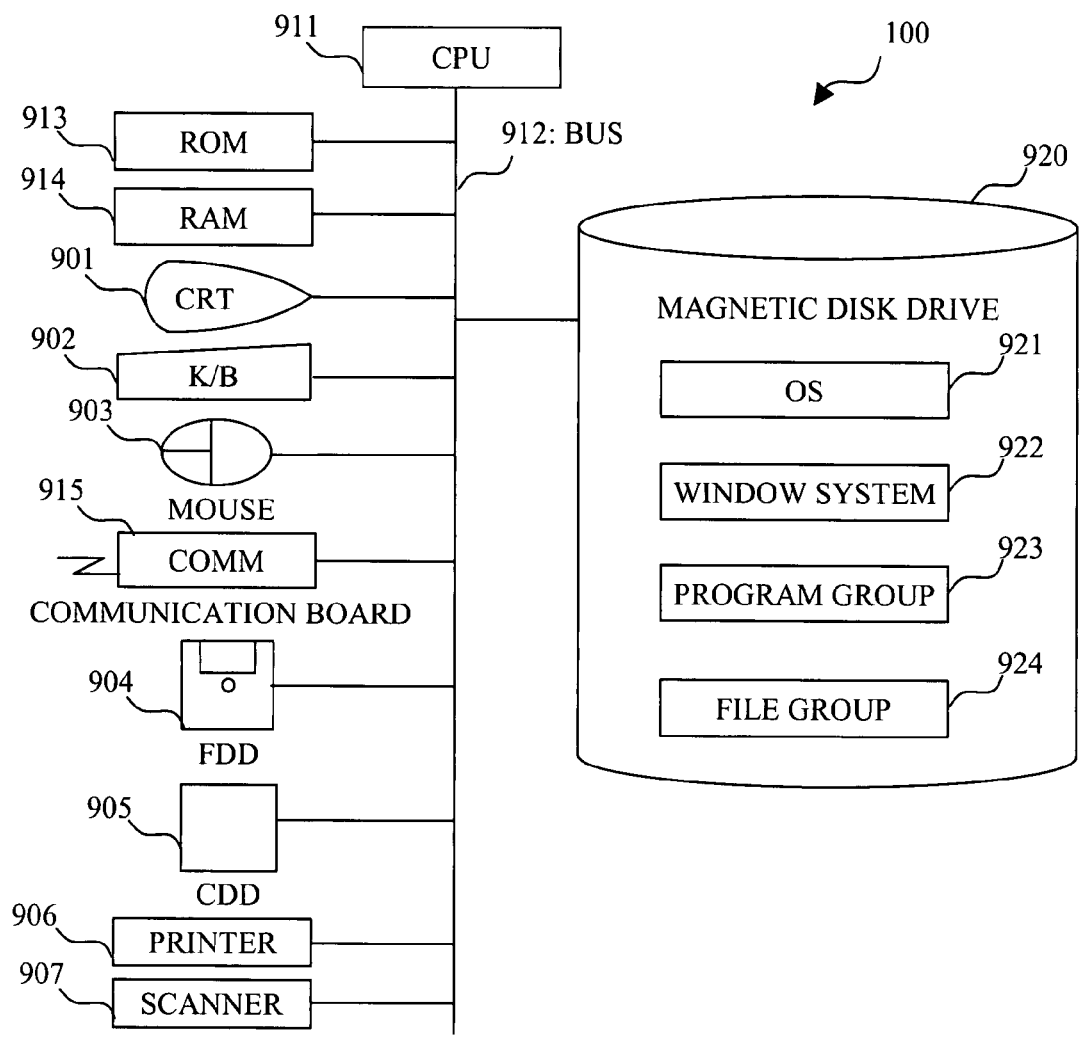
FIG. 2 shows an example of the hardware structure of the data conversion apparatus according to Embodiments 1 to 5.
Figure 3:
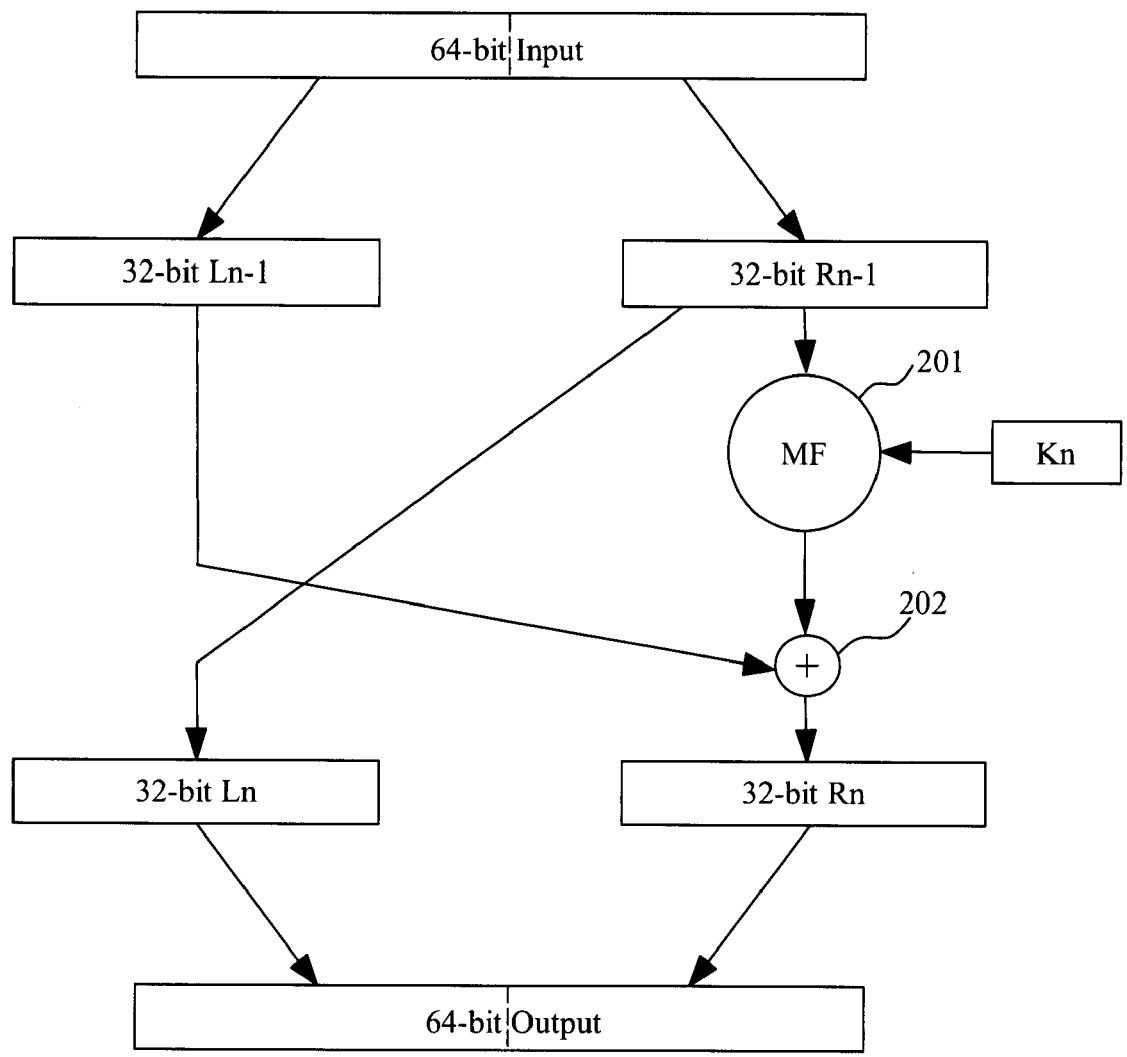
FIG. 3 shows a round structure being a basis of an operation of the DES.
Figure 4:
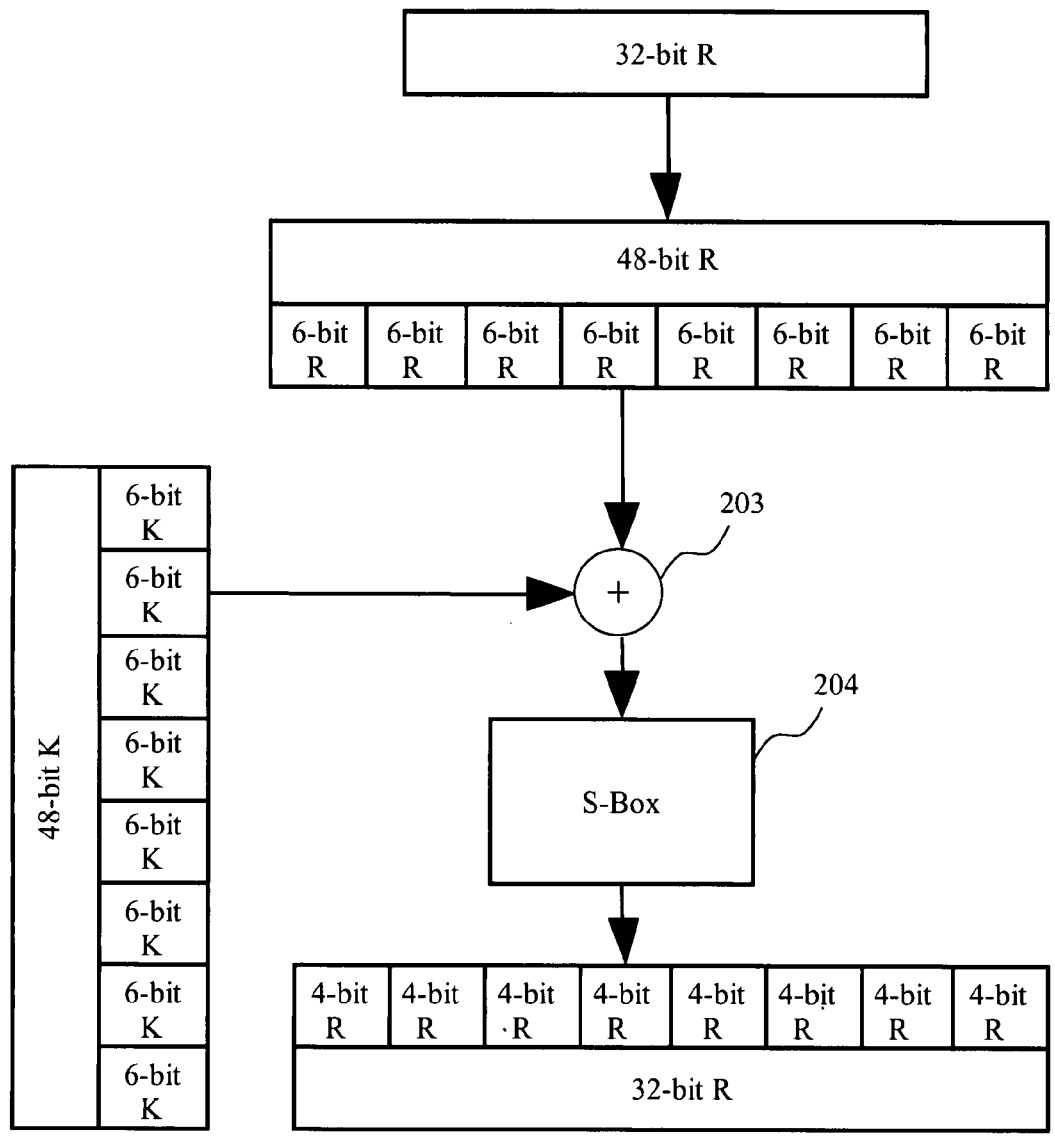
FIG. 4 shows details of operation processing of a mixing function (MF)
Figure 5:
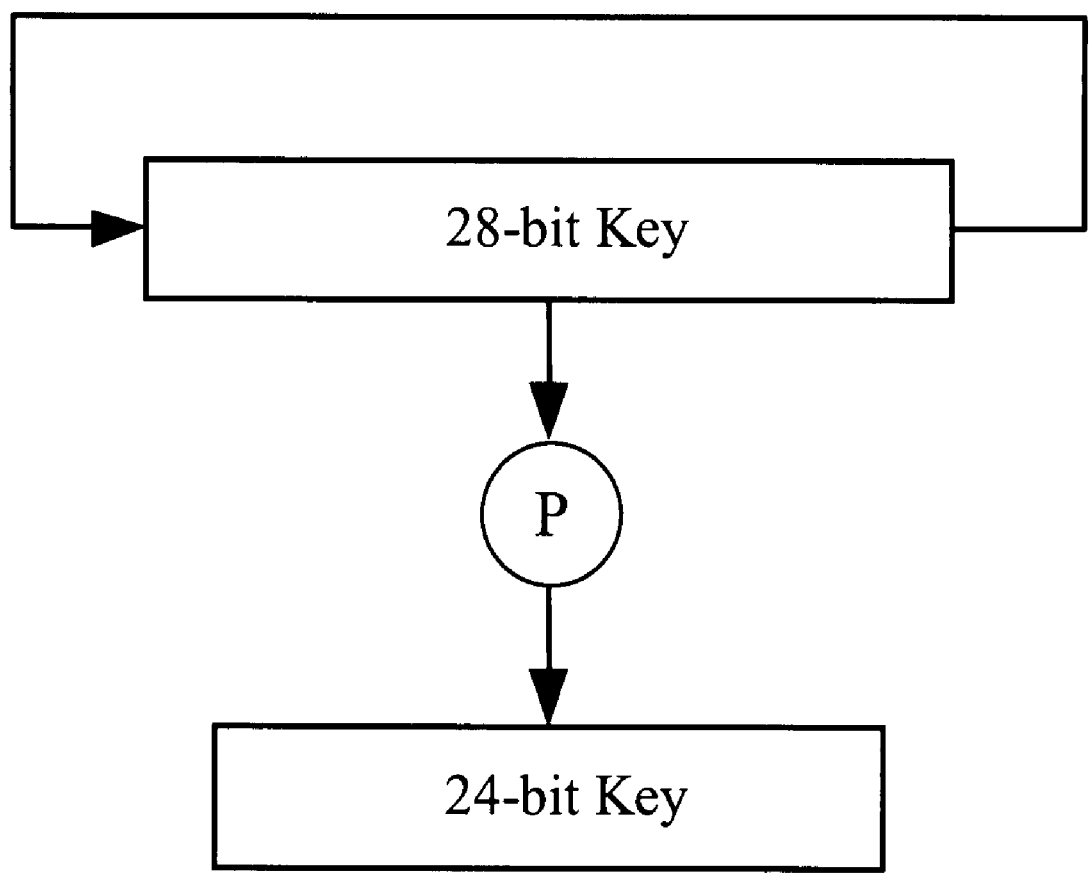
FIG. 5 shows generation processing of a key of a round.
Figure 6:
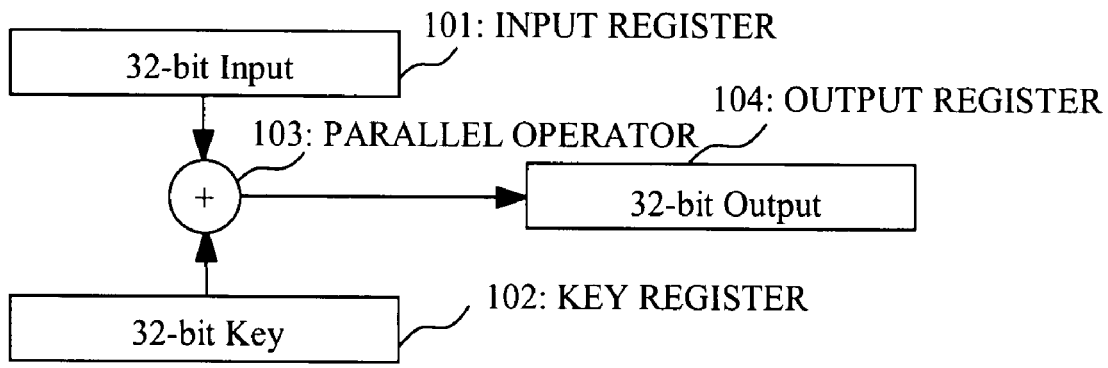
FIG. 6 shows a basic form of a data conversion algorithm according to Embodiment 1.
Figure 7:
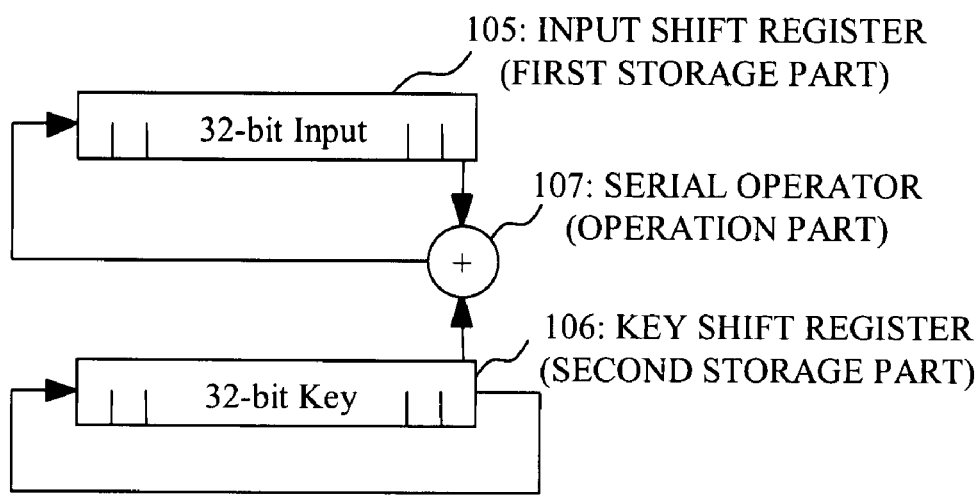
FIG. 7 shows an example of the configuration of a data conversion apparatus according to Embodiment 1.
Figure 8:
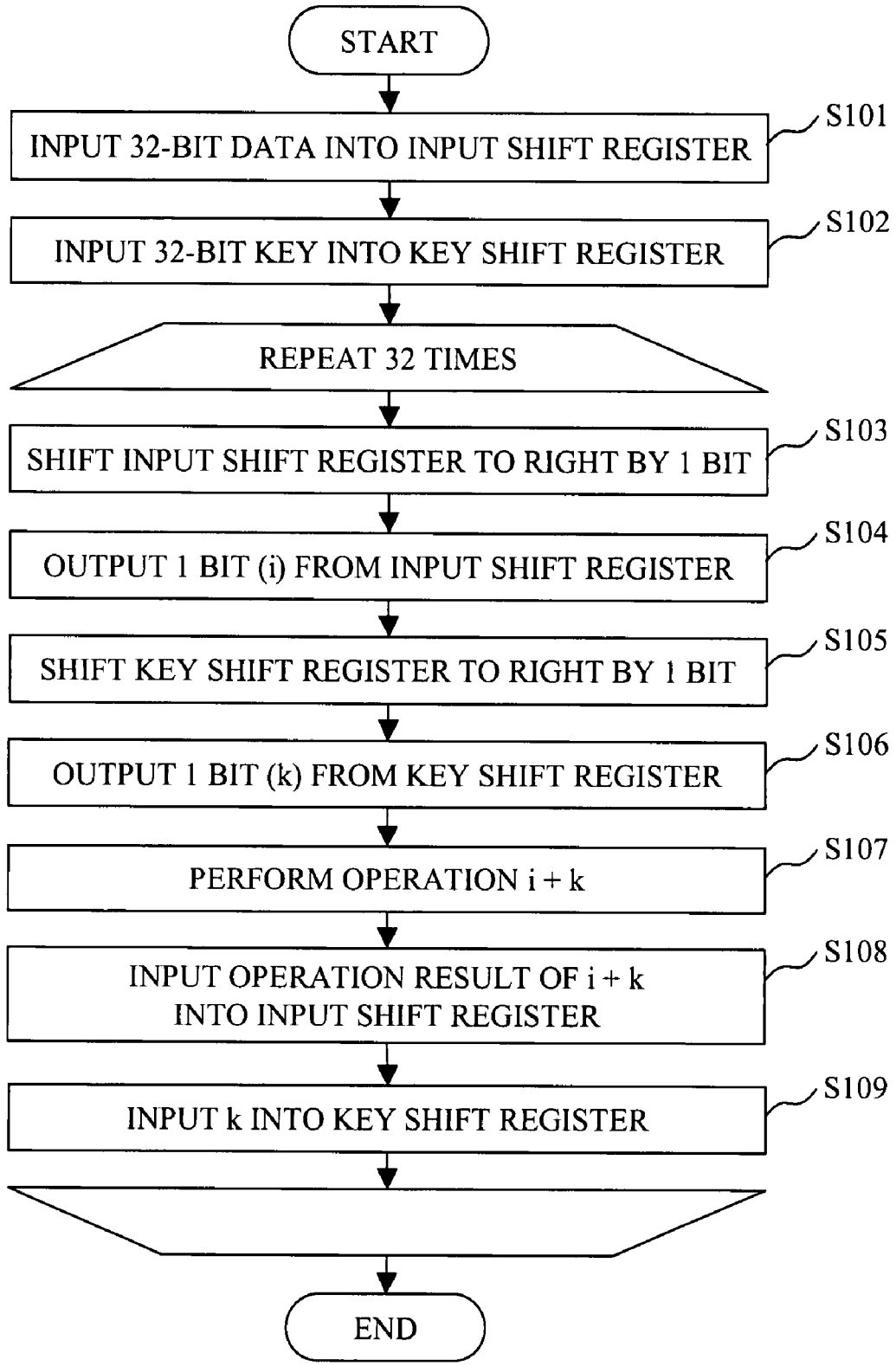
FIG. 8 is a flowchart showing an example of operations of the data conversion apparatus according to Embodiment 1.
Figure 9:
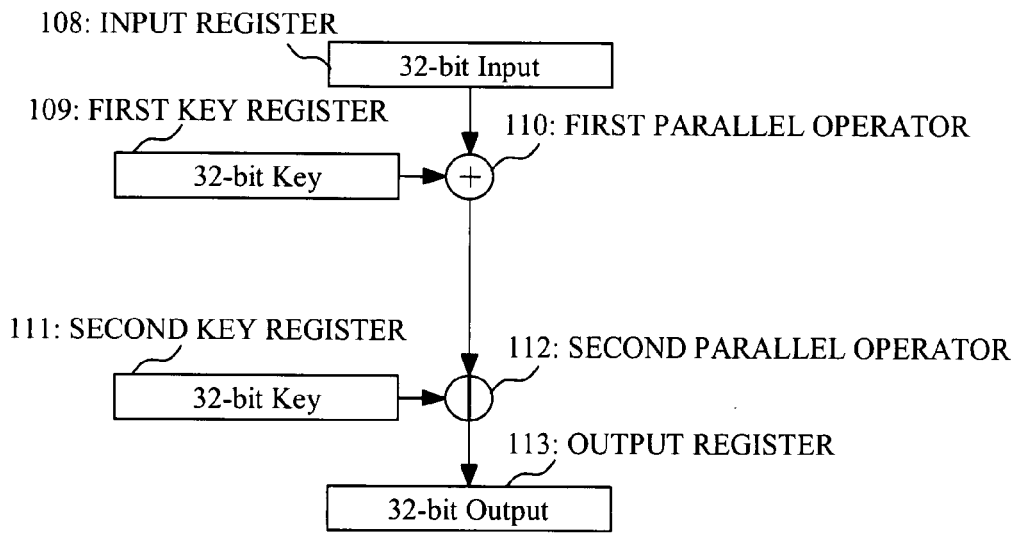
FIG. 9 shows a basic form of a data conversion algorithm according to Embodiment 2.
Figure 10:
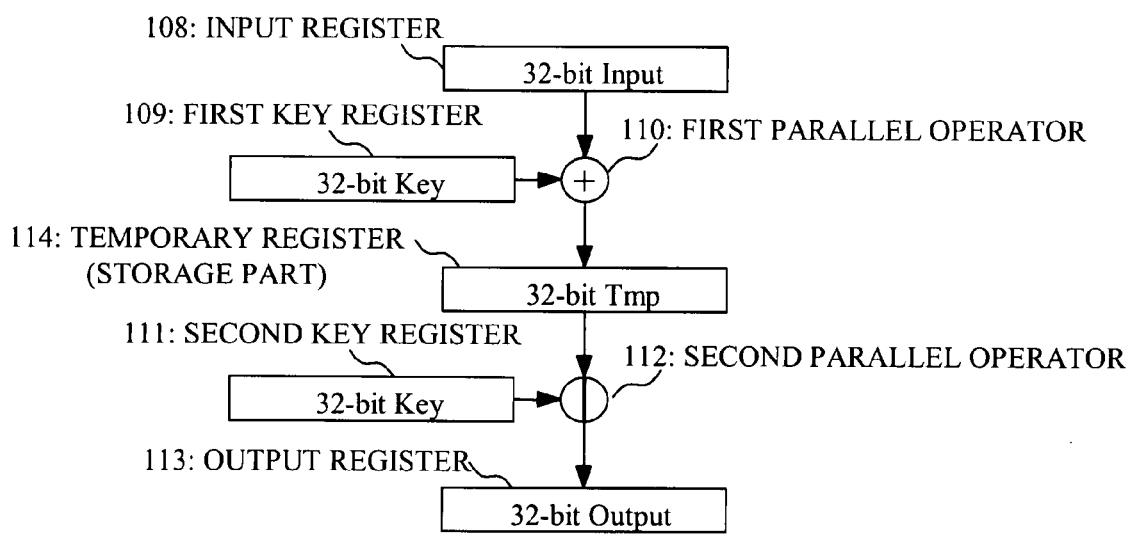
FIG. 10 shows an example of the configuration of a data conversion apparatus according to Embodiment 2.
Figure 11:
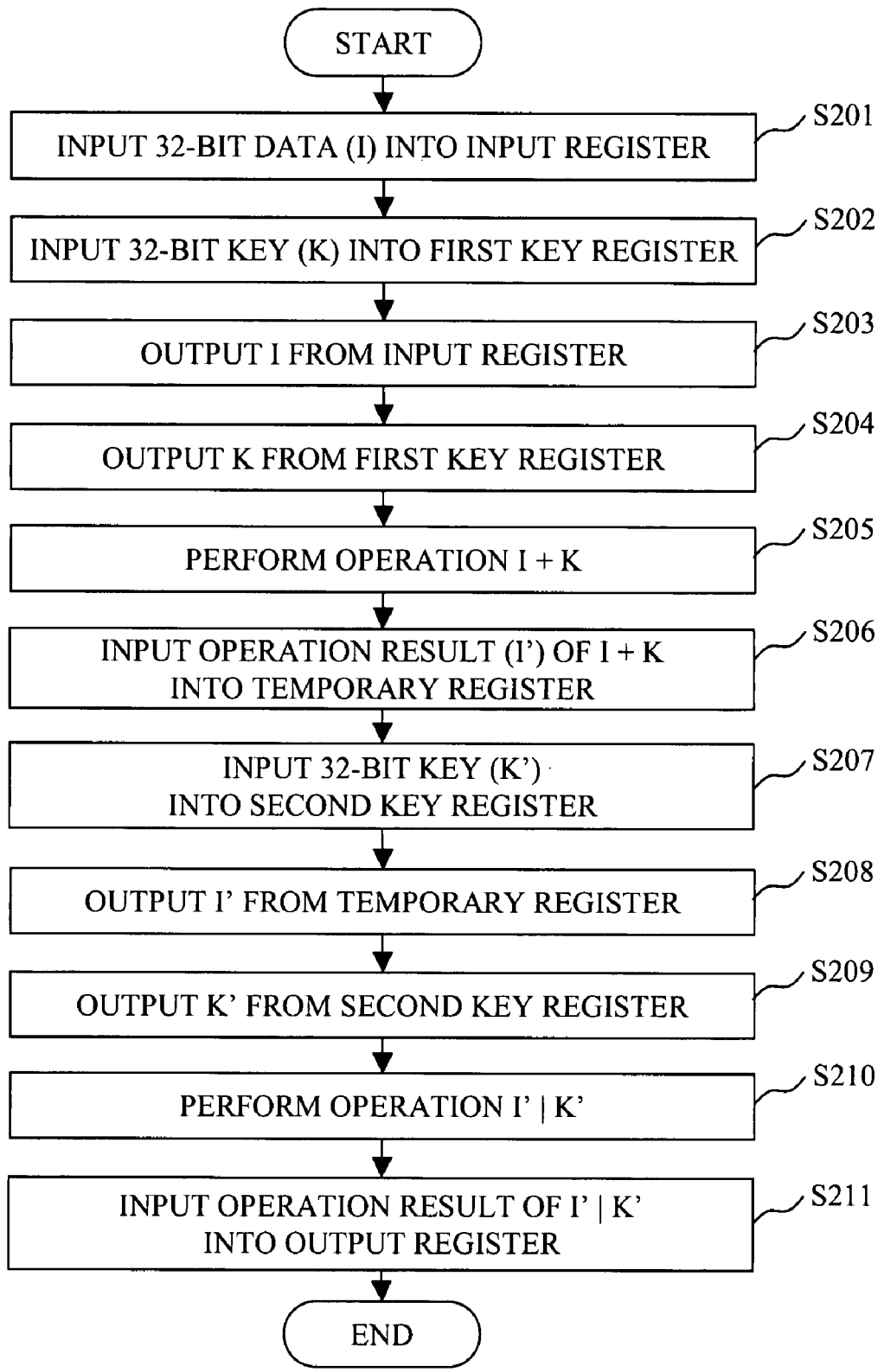
FIG. 11 is a flowchart showing an example of operations of the data conversion apparatus according to Embodiment 2.
Figure 12:
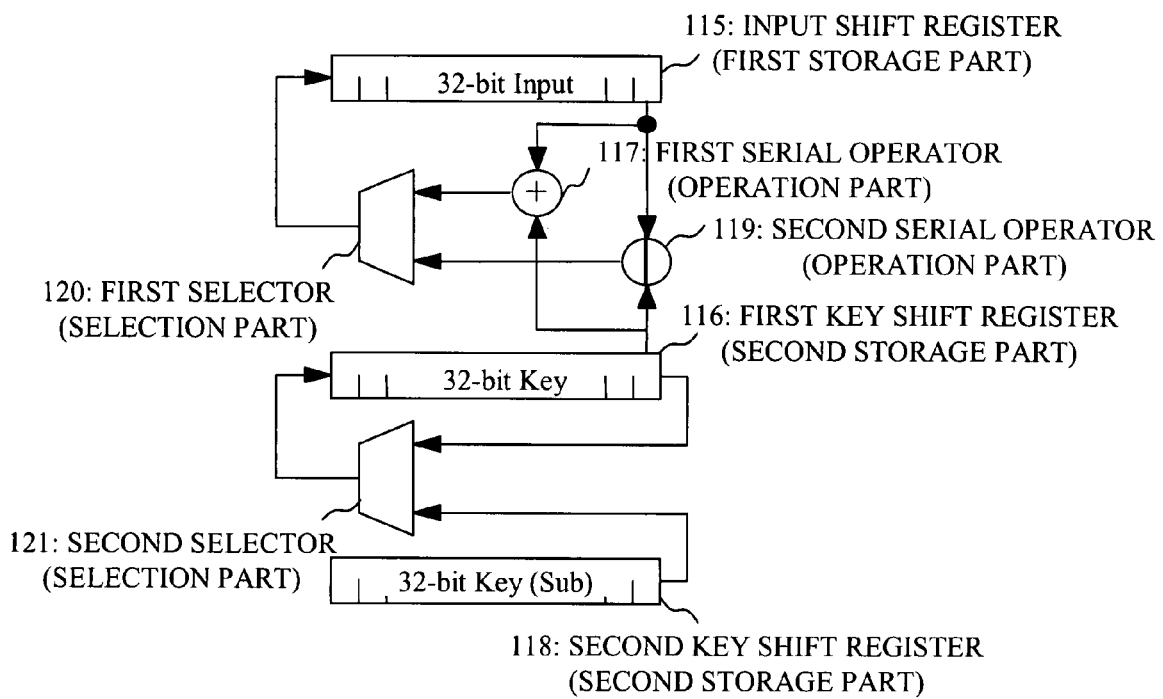
FIG. 12 shows an example of the configuration of a data conversion apparatus according to Embodiment 3.
Figure 13:
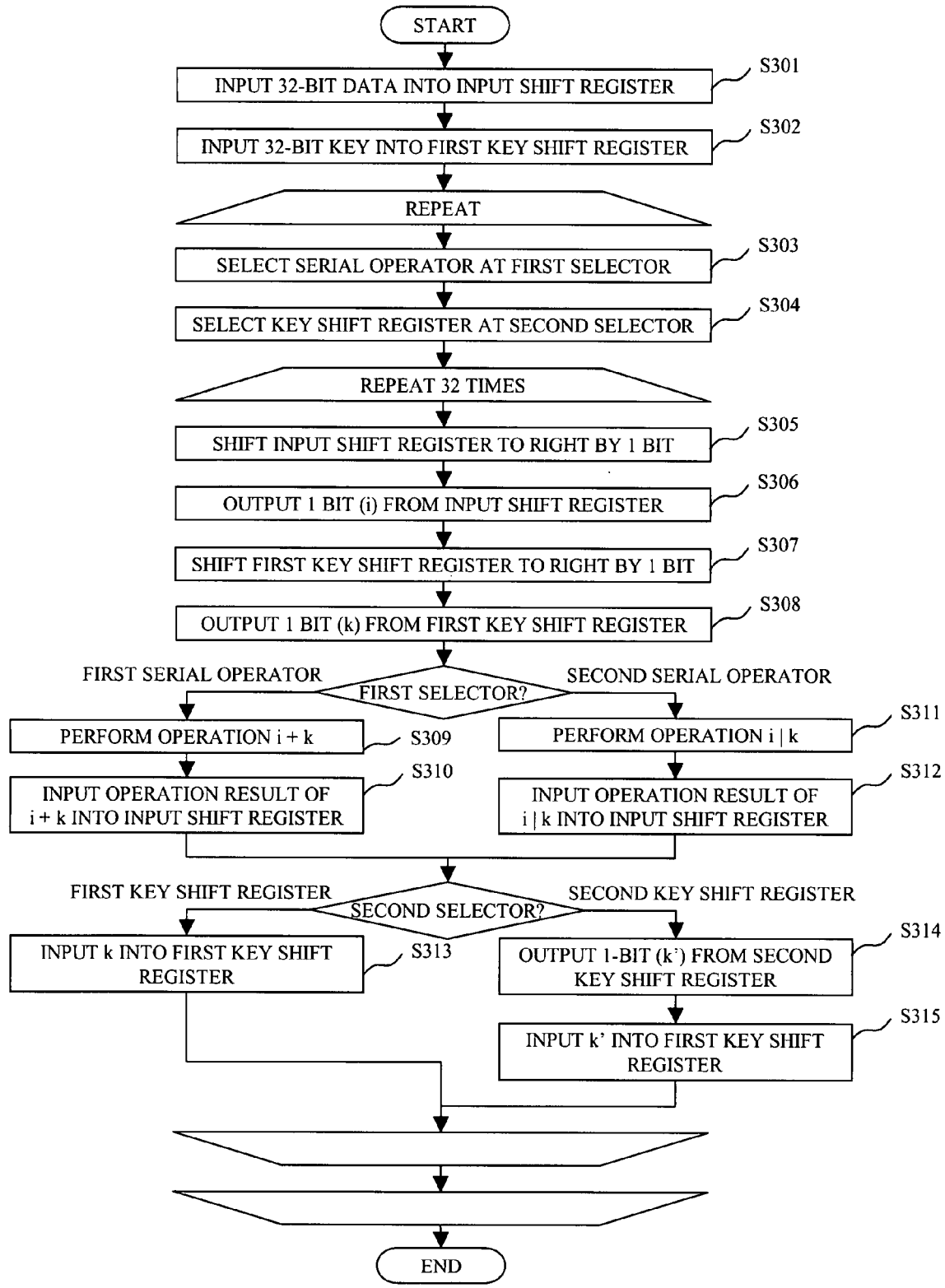
FIG. 13 is a flowchart showing an example of operations of the data conversion apparatus according to Embodiment 3.
Figure 14:
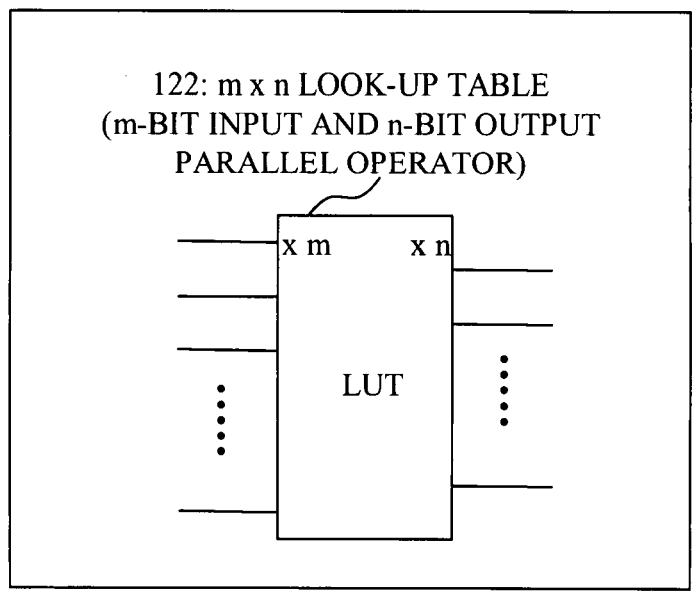
FIG. 14 shows a basic form of a data conversion algorithm according to Embodiment 4.
Figure 15:
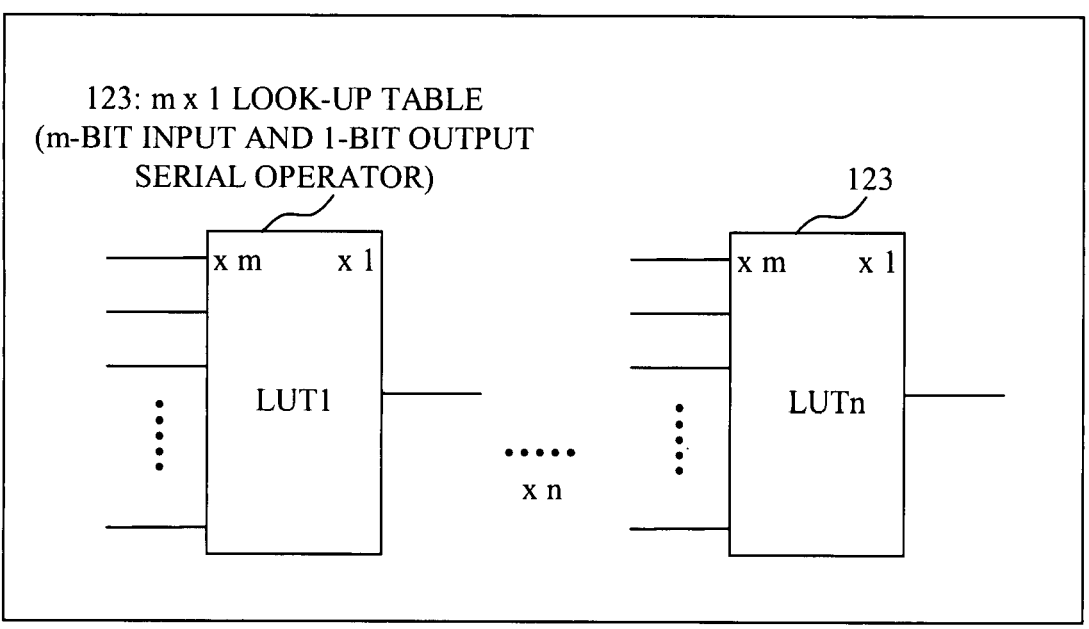
FIG. 15 shows an example of the configuration of a data conversion apparatus according to Embodiment 4.
Figure 18:
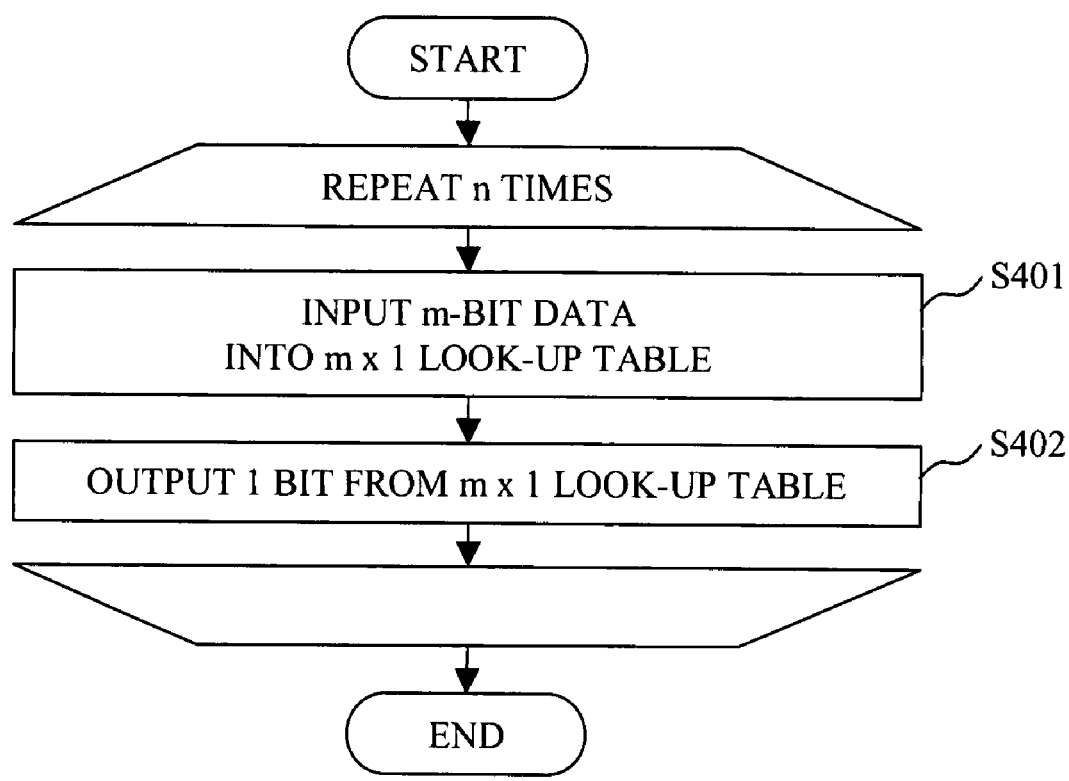
FIG. 18 is a flowchart showing an example of operations of the data conversion apparatus according to Embodiment 4.
Figure 19:
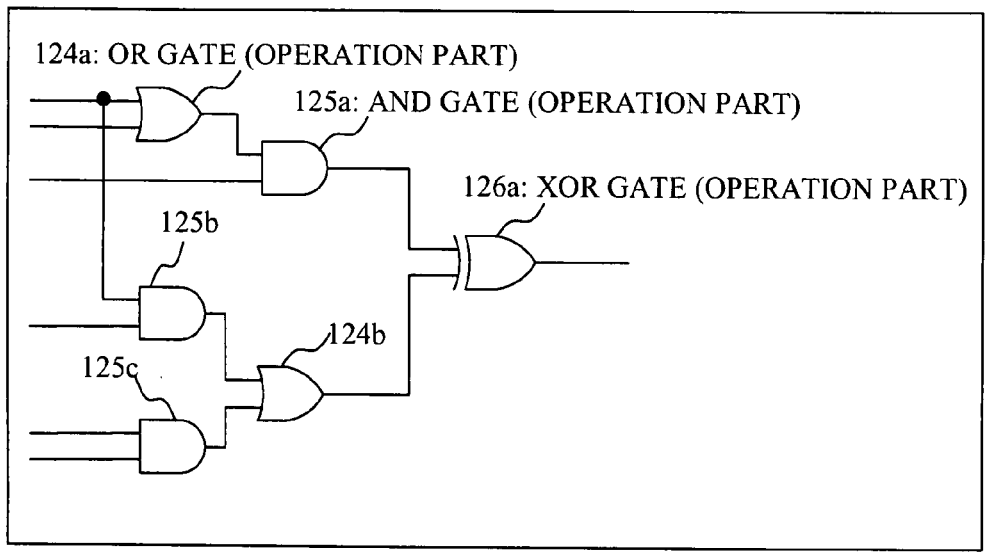
FIG. 19 shows a basic form of a data conversion algorithm according to Embodiment 5.
Figure 20:
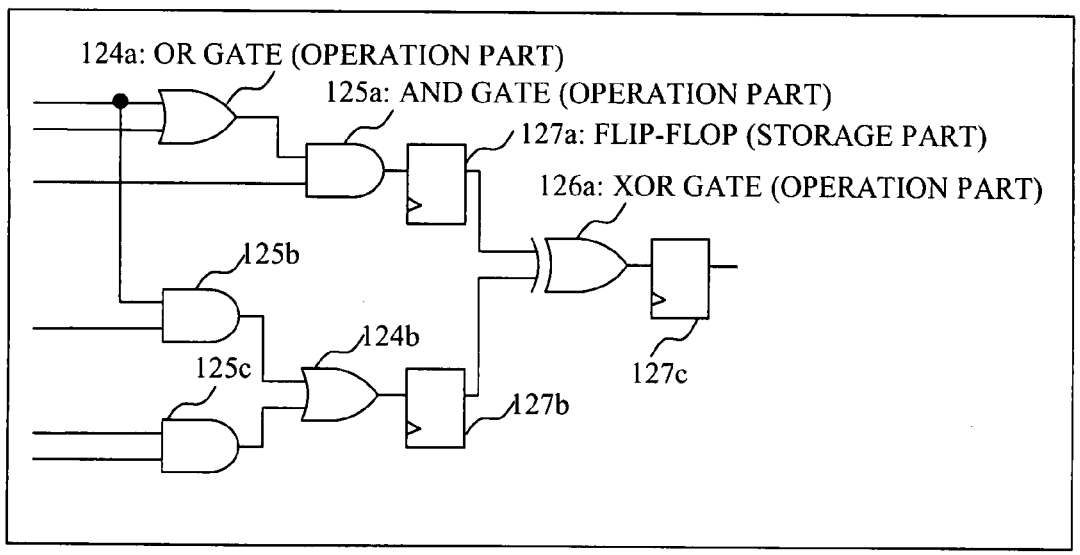
FIG. 20 shows an example of the configuration of a data conversion apparatus according to Embodiment 5.
Figure 21:
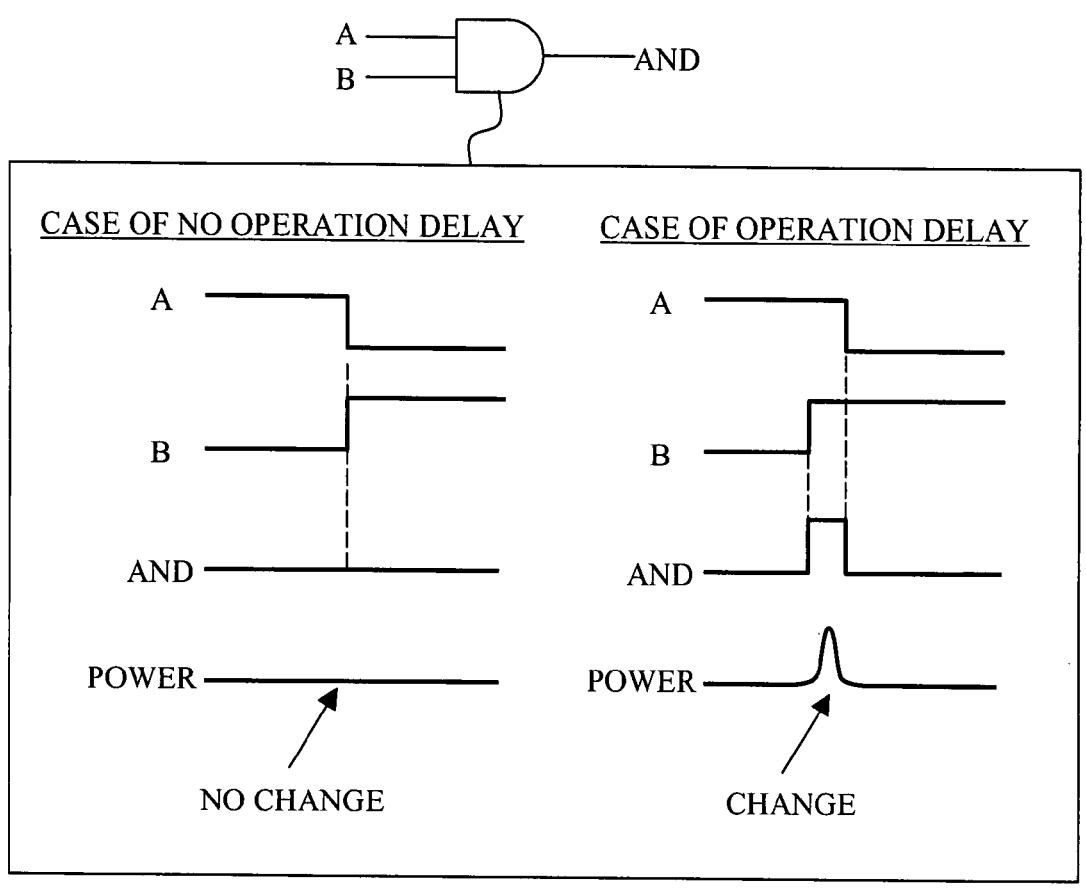
FIG. 21 shows an example of influence on the amount of power consumption, caused by difference with respect to an operation delay per bit.

DESCRIPTION OF THE REFERENCE NUMERALS 100 data conversion apparatus, 101,108 input register, 102 key register, 103 parallel operator, 104,113 output register, 105,115 input shift register, 106 key shift register, 107 serial operator, 109 first key register, 110 first parallel operator, 111 second key register, 112 second parallel operator, 114 temporary register, 116 first key shift register, 117 first serial operator, 118 second key shift register, 119 second serial operator, 120 first selector, 121 second selector, 122 m×n look-up table, 123 m×1 look-up table, 124 OR gate, 125 AND gate, 126 XOR gate, 127 flip-flop, 201 mixing function, 202,203 exclusive-OR operation, 204 S-Box, 901 CRT display device, 902 K/B, 903 mouse, 904 FDD, 905 CDD, 906 printer device, 907 scanner device, 910 system unit, 911 CPU, 912 bus, 913 ROM, 914 RAM, 915 communication board, 920 magnetic disk drive, 921 OS, 922 window system, 923 program group, 924 file group, 931 telephone, 932 facsimile, 940 Internet, 941 gateway, 942 LAN.

The invention claimed is:

1. A data conversion apparatus that converts data by using a combination of multi-bit operations, comprising:
a processing unit to process an encryption or decryption computation with a serial operation, to reduce an amount of power consumption per unit time compared with that in a case of the computation being processed with a multi-bit parallel operation,
a first storage part to store multiple bits and output each bit of the multiple bits one by one;
a second storage part to store other multiple bits and output each bit of the other multiple bits one by one; and
an operation part to perform an operation on the each bit outputted by the first storage part and the each bit outputted by the second storage part, and to make the first storage part store a result of the operation.

2. The data conversion apparatus according to claim 1, further comprising a selection part to select a type of the operation performed by the operation part.

3. The data conversion apparatus according to claim 1, wherein the first storage part and the second storage part are shift registers.

4. The data conversion apparatus according to claim 1, configured to process the computation with an m-bit (m>1) input and 1-bit output serial operation, wherein the parallel operation is an m-bit (m>1) input and n-bit (n>1) output.

5. A data conversion apparatus that converts data by using a combination of multi-bit operations, comprising:
a processing unit to process an encryption or decryption computation with separate operations of a preceding operation and a subsequent operation being separated by providing a storage part between the preceding operation and the subsequent operation, to reduce an amount of power consumption per unit time compared with that in a case of the encryption or decryption computation being processed with consecutive operations of a preceding operation and a subsequent operation being concatenated;
first register to store first multiple bits and to output the first multiple bits; and
second register to store second multiple bits and to output the second multiple bits, wherein
the preceding operation operates on the bits outputted by the first register and the bits outputted by the second register, and makes the storage part store a result of the preceding operation.

6. The data conversion apparatus according to claim 5, wherein, after storing all bits included in a result of the preceding operation, the storage part gives all the bits to the subsequent operation.

7. The data conversion apparatus according to claim 5, comprising
an operation part, including a plurality of input ports for inputting a result of the preceding operation, to perform the subsequent operation based on the inputting of the plurality of input ports,
wherein the storage part is provided before each input port of the operation part.

8. The data conversion apparatus according to claim 5, wherein the storage part is a temporary shift register.

9. The data conversion apparatus according to claim 5, comprising:
third register to store third multiple bits and to output the third multiple bits, wherein
the subsequent operation operates on the bits outputted by the storage part and the bits outputted by the third register, and makes an output register store a result of the subsequent operation.

10. A data conversion method using a data conversion apparatus that converts data by using a combination of multi-bit operations, the data conversion method comprising
processing an encryption or decryption computation with a serial operation, to reduce an amount of power consumption per unit time compared with that in a case of the computation being processed with a multi-bit parallel operation,
storing multiple bits in a first storage part and outputting each bit of the multiple bits one by one;
storing other multiple bits in a second storage part and outputting each bit of the other multiple bits one by one; and
performing an operation on the each bit outputted from the first storage part and the each bit outputted from the second storage part, and storing a result of the operation in the first storage part.

11. The data conversion method according to claim 10, further comprising
selecting a type of the operation on the each bit outputted from the first storage part and the each bit outputted from the second storage part.

12. The data conversion method according to claim 10, comprising
processing the computation with an m-bit (m>1) input and 1-bit output serial operation, wherein the parallel operation is an m-bit (m>1) input and n-bit (n>1) output.

13. A data conversion method using a data conversion apparatus that converts data by using a combination of multi-bit operations, the data conversion method comprising:
processing an encryption or decryption computation with separate operations of a preceding operation and a subsequent operation being separated by providing a storage part between the preceding operation and the subsequent operation, to reduce an amount of power consumption per unit time compared with that in a case of the encryption or decryption computation being processed with consecutive operations of a preceding operation and a subsequent operation being concatenated;
providing first register to store first multiple bits and to output the first multiple hits, and second register to store second multiple bits and to output the second multiple bits;
performing the preceding operation on the bits outputted by the first register and the bits outputted by the second register; and
storing a result of the preceding operation in the storage part.

14. The data conversion method according to claim 13, comprising
giving, after storing all bits included in a result of the preceding operation, all the bits in the storage part to the subsequent operation.

15. The data conversion method according to claim 13, comprising:
performing, by using an operation part that includes a plurality of input ports for inputting a result of the preceding operation, the subsequent operation based on the inputting of the plurality of input ports; and
providing the storage part before each input port of the operation part.

16. The data conversion method according to claim 13, wherein the storage part is a temporary shift register.

17. The data conversion method according to claim 13, comprising:
providing third register to store third multiple bits and to output the third multiple bits,
performing the subsequent operation on the bits outputted by the storage part and the bits outputted by the third register; and
storing a result of the subsequent operation in an output register.

* * * * *